United States Patent [19]
Halozan

[11] Patent Number: 5,410,569
[45] Date of Patent: Apr. 25, 1995

[54] DATA SLICING SYSTEM FOR HDTV RECEIVER

[75] Inventor: Scott F. Halozan, Des Plaines, Ill.

[73] Assignee: Zenith Electronics Corp., Glenview, Ill.

[21] Appl. No.: 931,176

[22] Filed: Aug. 19, 1992

[51] Int. Cl.$^6$ ............................................. H04L 25/49
[52] U.S. Cl. ..................... 375/286; 341/56; 341/81; 375/316
[58] Field of Search ............... 375/17, 75, 94; 341/95, 341/56, 81; 348/441

[56] References Cited

U.S. PATENT DOCUMENTS

| | | | |
|---|---|---|---|
| 4,394,642 | 7/1983 | Currie et al. | 341/81 |
| 4,518,947 | 5/1985 | Poston et al. | 341/81 |
| 5,086,340 | 2/1992 | Citta et al. | 358/141 |

Primary Examiner—Stephen Chin
Assistant Examiner—Hai H. Phan

[57] ABSTRACT

A receiver for receiving transmitted digital signals including either two level or four level symbols that are interleaved in a predetermined pattern in a frame format consisting of a plurality of successive data segments. The symbols are converted into ten bit numbers that are soft sliced to generate four bit numbers representing ranges of values within which each ten bit number may fall. The data represented by the four bit numbers is deinterleaved, a birate flag is generated that identifies the nature of each four bit number, i.e. whether it represents a two level symbol or a four level symbol, and a hard slicer operates, in response to the birate flag, for converting each of the four bit numbers to corresponding two bit binary outputs.

8 Claims, 3 Drawing Sheets

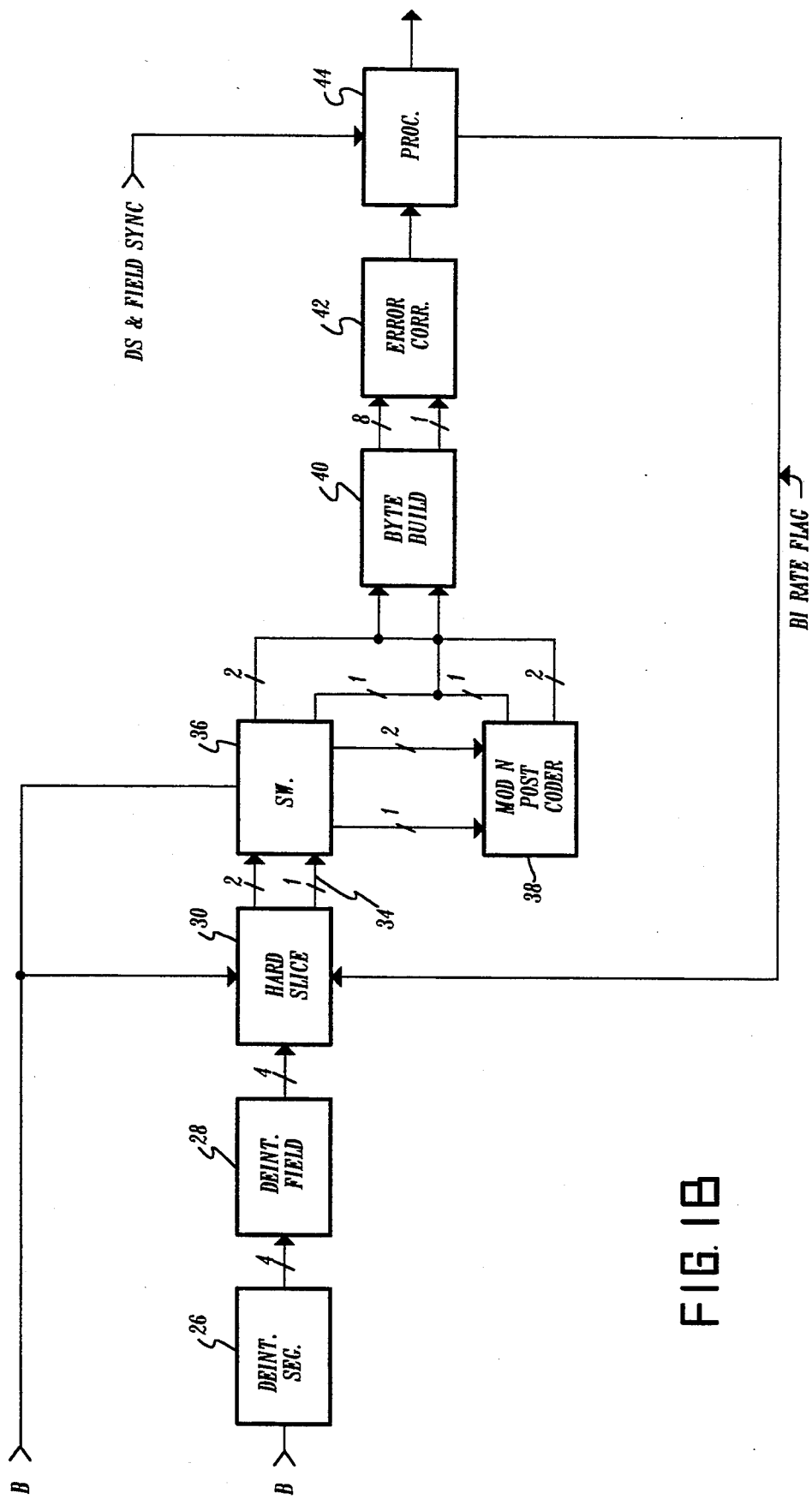

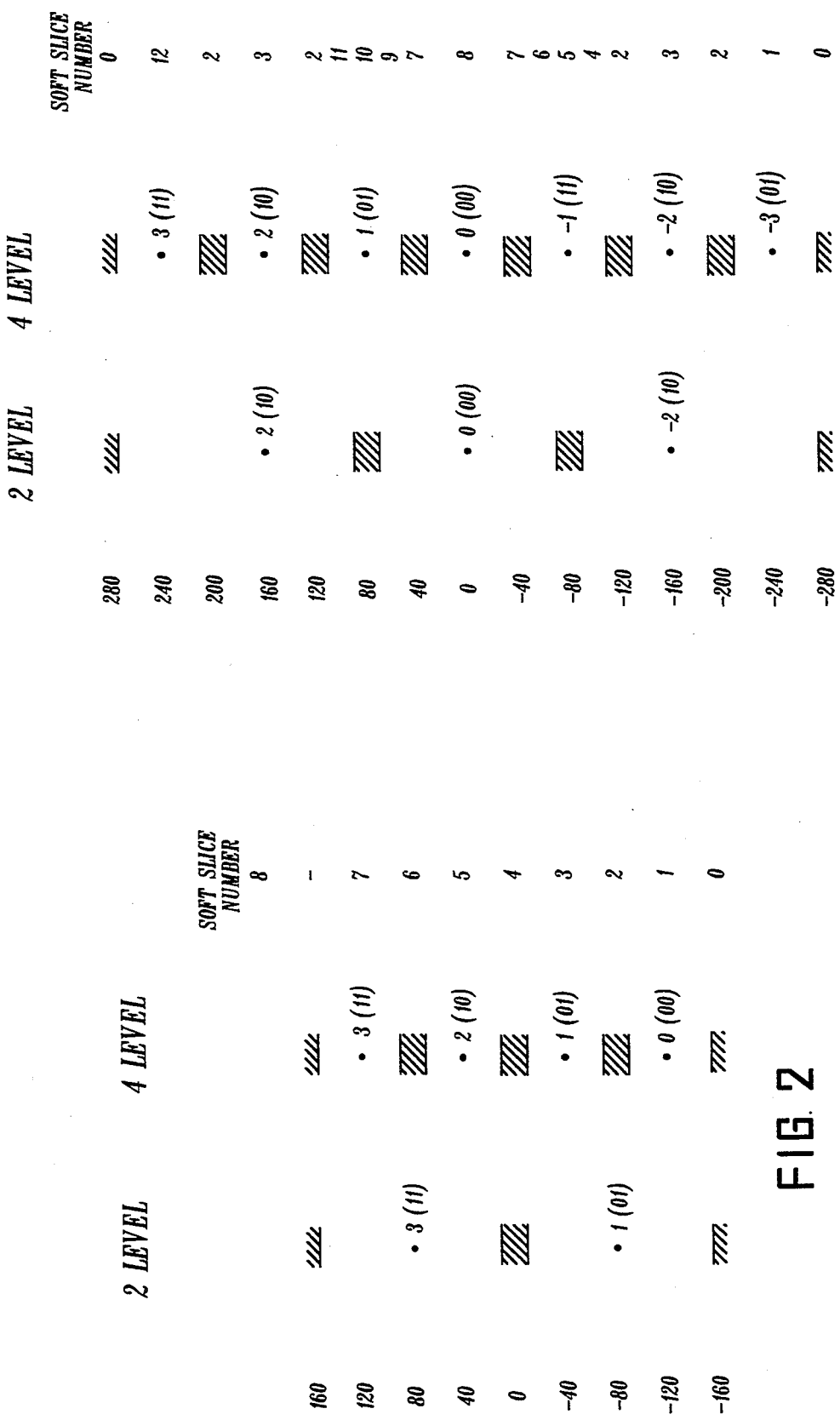

DATA SLICING SYSTEM FOR HDTV RECEIVER

CROSS REFERENCE TO RELATED APPLICATIONS

This invention is related to and is operable with apparatus disclosed and claimed in application Ser. No. 894,388, filed Jun. 5, 1992, Ser. No. 894,406, filed Jun. 5, 1992, Ser. No. 893,486, filed Jun. 5, 1992, U.S. Pat. No. 5,086,340, and Ser. No. 931,177, filed Aug. 17, 1992.

BACKGROUND OF THE INVENTION AND PRIOR ART

This invention is concerned with data handling and particularly directed to the data handling system used in the proposed Zenith/AT&T Digital Spectrum Compatible High Definition Television System (DSC-HDTV) which recently has undergone testing before the FCC. In that system, as disclosed and claimed in one or more of the above-identified copending applications, a digital high definition television signal is formatted into transmission frames, each comprising a pair of data fields which include a number of successive data segments. The initial segment of each field comprises a data field sync followed by 12 data segments of two level symbols, 240 data segments of either two level or four level symbols and 9 data segments of four level symbols. Each of the data segments is subdivided into a fixed number of subsegments. A transmission bit map, forming part of the first 12 data segments, identifies the two or four level character of the symbols in the 240 variable data segments. The subsegments are field interleaved by means of appropriate memories that are written to and read from in accordance with a predetermined algorithm. The data is line interleaved in a similar manner. A data correction system (Reed-Solomon) comprises the last 20 bytes of each four level data segment. The field and line interleaving are accomplished on a half field basis to conserve memory space. As disclosed in U.S. Pat. No. 5,086,340, the multilevel symbols of each field are preferably modulo N precoded to facilitate the use of a comb filter in the receiver for reducing NTSC co-channel interference.

As more completely disclosed in the copending application Ser. NO. 931,177, the subsegment symbol arrangement, and the line and field interleaving are selected to provide a high degree of rejection of NTSC co-channel signals, to guard against burst noise and to protect against vertically oriented interference from video edges in co-channel NTSC signals. The present invention is specifically directed to the technique for recovering (slicing) the incoming data, i.e. determining the level of the data, with particular regard to minimizing the amount of memory required for deinterleaving.

OBJECTS OF THE INVENTION

A principal object of the invention is to provide a novel HDTV receiver system.

Another object of the invention is to provide a slicing system for an interleaved HDTV signal that reduces the memory requirements for deinterleaving.

A further object of the invention is to provide a simple, cost effective receiver for slicing received two and four level data in an HDTV system.

BRIEF DESCRIPTION OF THE DRAWINGS

These and other objects and advantages of the invention will be apparent upon reading the following description in conjunction with the drawings, in which:

FIGS. 1A and 1B together comprise a simplified block diagram of a receiver constructed in accordance with the invention;

FIG. 2 is a chart illustrating the slicing operation when the receiver is operating in the absence of substantial NTSC co-channel interference; and FIG. 3 represents a similar chart illustrating the slicing operation when the receiver is operating in the presence of substantial NTSC co-channel interference.

DESCRIPTION OF THE PREFERRED EMBODIMENT

Figure 1A:
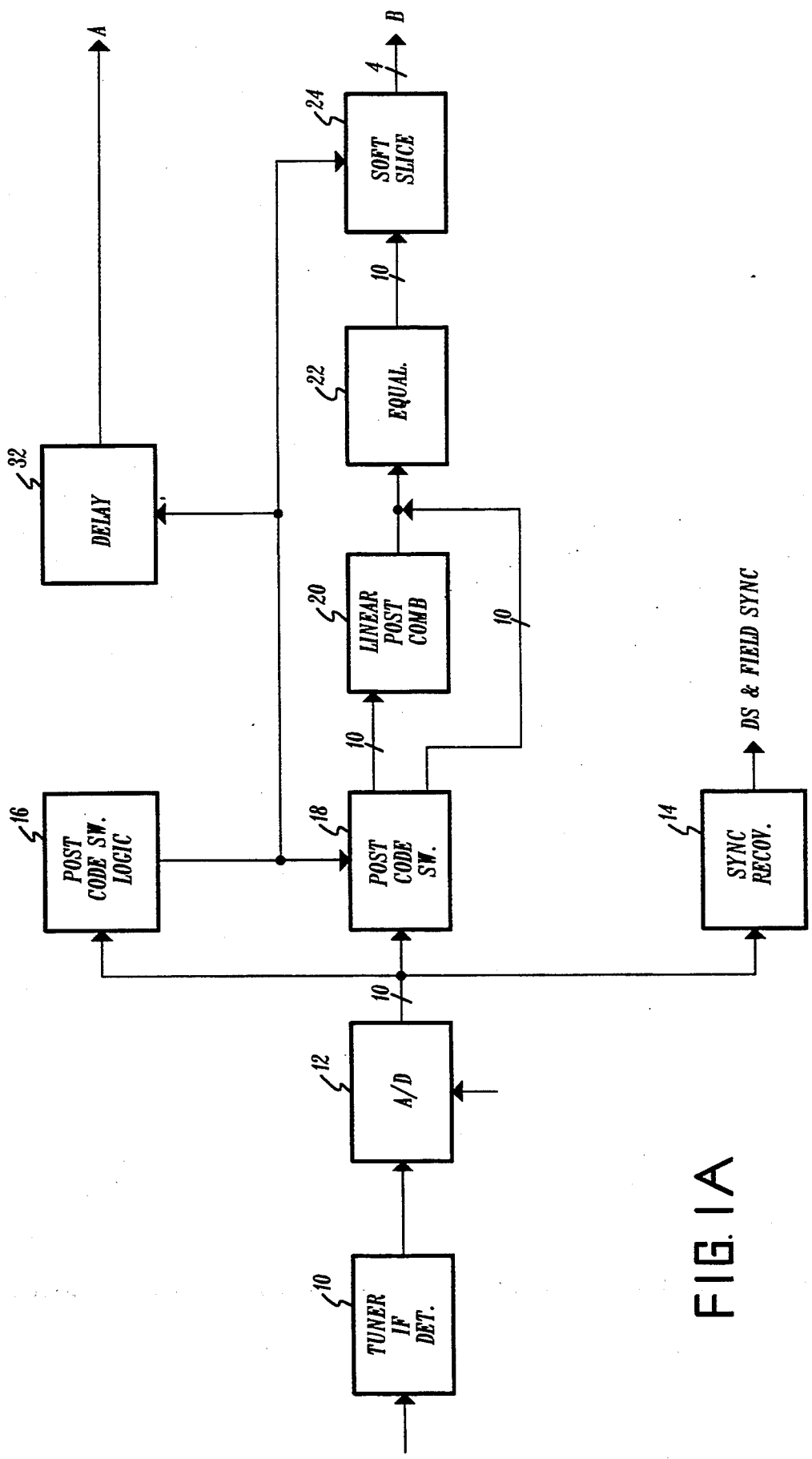

Referring to FIGS. 1A and 1B, and in particular to FIG. 1A, a received DSC-HDTV signal is converted by a tuner IF detector 10 to a baseband analog signal, which is applied to an analog-to-digital (A/D) converter 12. The analog signal may represent either two level symbols or four level symbols as fully disclosed in copending application Ser. No. 872,211, filed Mar. 12, 1991, and comprises successive fields that alternately include 262 and 263 lines or data segments. As mentioned above, each data segment comprises 12 subsegments which are interleaved on both an intrafield and an intrasegment basis. Each data segment comprises 12 interleaved subsegments and the transmission bit map is received as part of the first 12 segments of two level data of each field. It will be appreciated that the two level data is more robust, i.e. noise immune, than the four level data and therefore the most important information, such as the sync information and video motion vectors, is preferably transmitted as two level symbols.

A/D converter 12 converts the received analog signal to a 10 bit digital signal which represents the amplitude of the incoming received modulo N precoded symbols. A/D converter 12 is coupled to a synchronizing signal recovery circuit 14 that operates in accordance with copending applications Ser. Nos. 894,388 and 894,406 to recover the data segment sync and field sync signals used for timing in the receiver. It will be appreciated that the sync signal recovery function and other functions indicated in the various blocks are disclosed in detail in various of the copending applications mentioned above and are not disclosed as fully herein since they are not part of the present invention. A/D converter 12 is also coupled to a post code switching logic circuit 16 which functions in accordance with copending application Ser. No. 893,486, to determine whether the HDTV signal is being received in the presence of a substantial interfering NTSC co-channel signal.

In the event that a substantial interfering NTSC co-channel signal is present, appropriate logic signals are sent to a post code switch circuit 18, which is also supplied by A/D converter 12, to provide an output to a linear post comb circuit 20. In the event post code logic circuit 16 determines that there is minimal or no interference from NTSC co-channels (as determined by a preset threshold level) post code switch circuit 18 routes its 10 bit output around linear post comb circuit 20 to an equalizer 22. The linear post comb circuit 20 is used in the presence of NTSC co-channel interference since it effectively eliminates the harmful effects of the major portion of that interference. However it does impose a signal to noise ratio reduction and also increases the number of levels characterizing the processed symbols. In the arrangement shown, post code switch logic 16 generates a logic "1" post code flag in the presence of NTSC co-channel interference (that exceeds the threshold level). The flag causes post code switch 18 to couple its 10 bit output to linear post comb filter 20. Filter 20 operates to develop a filtered 10 bit output signal with reduced co-channel interference (as fully discussed in U.S. Pat. No. 5,086,340) which is supplied to channel equalizer 22. Channel equalizer 22, among other operations, removes the DC component of the received signal. Due to the combing action of filter 20, its output comprises seven level symbols (representing received and filtered four level symbols) or three level symbols (representing received and filtered two level symbols), respectively. In the absence of significant NTSC co-channel interference (below the threshold), post code switch logic 16 develops a logic "0" post code flag which causes post code switch 18 to couple the 10 bit signal from A/D 12 directly to channel equalizer 22. In this situation, no increase in symbol levels occurs. The 10 bit output of channel equalizer 22 is supplied to a "soft" slice circuit 24 which executes bit reduction slicing in accordance with the illustration in FIG. 2 in response to a logic 0 post code flag and bit reduction slicing in accordance with FIG. 3 in response to a logic 1 post code flag.

FIG. 2 represents soft slicing of signals that are not subject to significant NTSC co-channel interference and therefore bypass linear post comb filter 20 (thereby not suffering the signal-to-noise ratio degradation imposed by filter 20). The possible amplitude of the applied 10 bit precoded samples from A/D 12 are mapped or converted to nine 4 bit numbers corresponding to 0-8. Amplitude levels below −160 are mapped to 0, and represent symbol errors. Amplitudes between −82 and −160 are mapped to 1. These amplitudes represent the 0 level of a precoded four level symbol or the 1 level of a precoded two level symbol. Amplitudes between −78 and −82 are mapped to 2 and represent a symbol error for a four level precoded symbol or a 1 level of a two level precoded symbol. Similarly, amplitudes between −78 and −2 are mapped to 3 and represent either a 1 level of a precoded two level signal, or a 1 level of a precoded four level signal. Amplitudes between −2 and +2 are mapped to 4 and represent a symbol error for both a four level and a two level precoded signal, and so on. It will be appreciated that the soft slice numbers representing symbol errors define relatively small amplitude ranges between adjacent symbol levels which cannot be resolved with complete confidence.

The arrangement of FIG. 3 is similar except that the number of levels of the received symbols have been increased by the operation of linear post comb filter 20. Thus, the 3 and 7 level outputs of filter 20 (representing received 2 and 4 level symbols, respectively) are mapped to 13 (0-12) 4-bit soft slice numbers representing the various input levels as well as a number of error regions. It will also be observed that certain soft slice numbers are used more than once to represent equivalent conditions.

Referring back to FIGS. 1A and 1B and in particular to the input of FIG. 1B, the four bit output of soft slicer 24 is applied to a segment deinterleaving circuit 26, which output is in turn applied to a field deinterleaving circuit 28. These circuits, which function to deinterleave the intrasegment and intrafield interleaved symbols, are discussed in corresponding copending application Ser. No. 935,177 above. The bit reduction (from 10 to 4) effected by soft slicer 24 allows the memory required to implement the deinterleaving circuits 26 and 28 to be reduced by a factor of 2½. Segment deinterleaver 26 groups subsegments into successive sequences of adjacent symbols and field deinterleaver 28 places each subsegment back into its proper data segment. As a result, the TBM (transmission bit map) is oriented in its proper location in the first 12 segments of received 2-level symbols. The output of field deinterleaver 28 is now supplied to a hard slicer 30 which also receives the post code flag through a delay circuit 32 and a birate flag which is partially derived from the received transmission bit map. The birate flag is received from a processor 44 as will be discussed. Depending upon the post code and the bitate flags, hard slicer 30 converts the four bit soft slice numbers (see FIG. 2 or FIG. 3) to the appropriate two level or four level binary values which are shown in parenthesis in FIGS. 2 and 3.

Referring to the four level precoded signals of FIG. 2, a 0 level precoded symbol has a binary value of 00, a 1 level precoded symbol has a binary value of 01, a 2 level precoded symbol has a binary value of 10, and a 3 level precoded symbol has a binary value of 11. Preferably, the levels for the two level symbols are selected to be intermediate the outermost pairs of levels of the four level symbols as fully described and claimed in copending application Ser. No. 872,211 above. For the two level symbols, the first level is 1 (binary 01) and the second level is 3 (binary 11).

In FIG. 3, the linear post comb levels 0, 1, 2 and 3 for four level symbols are represented by the same binary values as the corresponding levels in FIG. 2. The levels −1, −2 and −3, however, are represented by the respective binary values 11, 10 and 01 to effect modulo 4 conversion of the 7-level symbols to the corresponding 4-level symbols prior to precoding in the transmitter. Similarly, the 3-level symbols in FIG. 3 are modulo 2 converted to the corresponding 2-level symbols by assigning the binary value 10 to both levels 2 and −2.

Thus, for example, if the post code flag is 0 (i.e. filter 20 is not active) and the birate flag is 1 (i.e. the processed signal represents a received 2-level symbol), the soft slice numbers 0–8 of FIG. 2 are converted to the two bit binary numbers set forth in the two level column of FIG. 2. If the birate flag is 0, the soft slice numbers 0–8 are converted to the two bit binary numbers in the four level column of FIG. 2. Soft slice numbers 0, 4 and 8 in the two level column and 0, 2, 4, 6 and 8 in the four level column are converted to a one bit error flag.

For the situation where the post code flag and the birate flag are both logic 1, the soft slice numbers 0–12 of FIG. 3 are converted to the binary values of the two level column. If the post code flag is 1 and the birate flag is 0, the soft slice numbers are converted to the binary levels in the four level column. The soft slice numbers 0, 5 and 10 in the two level column and 0, 2 and 7 in the four level column are converted to a one bit error flag on output 34.

Returning to FIG. 1B, the two bit binary values developed by hard slicer 30 and the error flag output 34 are coupled to a switch 36, which is also operated in response to the post code flag from delay 32. A post code flag of 0 indicates that the received signals were not processed by the linear comb filter 20 and the binary values are therefore applied to a modulo N post code filter 38 (along with the error flag) for modulo N postcoding and from there to a byte builder 40. A post code flag of 1 indicates that the received signals were processed by linear post comb filter 20 and the binary values from hard slicer 30 (and any error flag) are directly coupled to byte builder 40.

Byte builder 40 thus receives the data and error flag from either switch 36 or post coder 38. Byte builder 40 groups the two bit binary values from switch 36 and post coder 38 into eight bit bytes for application to an error correction circuit 42, which in the preferred embodiment is a Reed-Solomon error corrector. Two level data takes eight transmission symbols per byte and four level data takes four transmission symbols per byte. Each byte is accompanied by the one bit error flag which represents an error in any of the symbols that comprise the associated byte. The corrected bytes from the Reed-Solomon corrector circuit 42 are applied to a processor 44 for further signal processing to reconstitute the high definition video, and other information.

It should be noted that processor 44 recovers the transmission bit map information from which the birate flag is derived. This occurs since the transmission bit map is encoded in the first 12 segments which always comprise two level symbols. This permits the birate flag to set to 1 for these segments. Subsequent symbols are processed in accordance with the transmission bit map which determines whether they are two level or four level symbols.

The invention teaches separating the slicing function into a soft slice for bit reduction (and substantial savings in memory) and a hard slice for determination of the amplitude levels of the transmitted symbols. The result is a significant cost reduction in a birate transmission system having interleaved data.

It is recognized that numerous changes in the described embodiment of the invention will be apparent to those skilled in the art without departing from its true spirit and scope. The invention is to be limited only as defined in the claims.

What is claimed is:

1. A receiver for receiving digital data transmitted in the form of interleaved successive segments of multi level symbols comprising:
   means for receiving the transmitted multi level symbols and for converting the received symbols into corresponding N-bit numbers;
   first slicing means for converting said N-bit numbers into M-bit numbers representing respective ranges of values within which each of said N-bit numbers falls, where M is less than N;
   means for deinterleaving said M-bit numbers to produce deinterleaved M-bit numbers;
   second slicing means responsive to a flag identifying the number of symbol levels which said received symbols represent for converting each of said deinterleaved M-bit numbers to a corresponding data output representing respective ones of said multi level symbols; and
   means coupled to said second slicing means for generating said flat.

2. The receiver of claim 1 wherein said deinterleaving means comprises memory means.

3. The receiver of claim 2 wherein said multi level symbols comprise two level symbols and four level symbols.

4. The receiver of claim 3 wherein said N-bit numbers comprise 10 bits and said M-bit numbers comprise 4 bits.

5. The receiver of claim 1 wherein said second slicing means comprises means for modulo converting each of said M-bit numbers to said data output.

6. The receiver of claim 1, further including:
   interference filter means for increasing the number of levels which said N-bit numbers represent;
   switch means for selectively connecting said interference filter means between said means for receiving and said first slicing means;
   logic means coupled to said means for receiving for controlling operation of said switch means; and
   wherein said first and second slicing means are controlled by said logic means for operation in respective first or second modes depending upon whether said interference filter means is or is not connected between said means for receiving and said first slicing means.

7. A receiver for receiving digital data transmitted in the form of interleaved successive segments of multi level symbols comprising:
   means for receiving the transmitted multi level symbols and for converting received symbols into corresponding N-bit numbers;
   post comb filter means coupled to said means for receiving for increasing the number of levels which said N-bit numbers represent;
   post code switch means for selectively bypassing said post comb filter means;
   post code logic means coupled to said means for receiving for controlling said post code switch means;
   first slicing means responsive to said post code logic means for converting the said N-bit numbers into M-bit numbers representing respective ranges of values within which each of said N-bit numbers falls, where M is less than N;
   means for deinterleaving said M-bit numbers to produce deinterleaved M-bit numbers;
   second slicing means responsive to said cost code logic means and to a flag identifying the number of symbol levels which said received symbols represent for converting each of said deinterleaved M-bit numbers to a corresponding data output representing respective ones of said multi level symbols; and
   means coupled to said second slicing means for generating said flag.

8. In a system of the type wherein interleaved data is transmitted in the form of P or O-level symbols, a receiver comprising:
   means for receiving the transmitted P or O-level symbols and for converting received symbols into corresponding N-bit numbers;
   first slicing means for converting said N-bit numbers into M-bit numbers representing respective ranges of values within which each of said N-bit numbers falls, where M is less than N;
   means for deinterleaving said M-bit numbers to produce deinterleaved M-bit numbers;
   second slicing means responsive to a flag identifying each of said M-bit numbers as representing a P-level symbol or a O-level symbol for converting each of said deinterleaved M-bit numbers to a corresponding data output representing a respective one of said received symbols; and
   means coupled to said second slicing means for generating said flag.

* * * * *